(12) United States Patent
Chou

(10) Patent No.: US 8,289,295 B2
(45) Date of Patent: Oct. 16, 2012

(54) WIRELESS MULTI-USER TOUCH CONTROL SYSTEM

(76) Inventor: Hsien-Chung Chou, New Taipei (TW)

( * ) Notice: Subject to any disclaimer, the term of this patent is extended or adjusted under 35 U.S.C. 154(b) by 168 days.

(21) Appl. No.: 12/955,031

(22) Filed: Nov. 29, 2010

(65) Prior Publication Data

US 2011/0069032 A1    Mar. 24, 2011

Related U.S. Application Data

(63) Continuation-in-part of application No. 11/819,006, filed on Jun. 25, 2007, now abandoned, and a continuation-in-part of application No. 12/007,396, filed on Jan. 10, 2008, now abandoned.

(30) Foreign Application Priority Data

May 18, 2007    (TW) .............................. 96208162 U
Nov. 30, 2007   (TW) .............................. 96220291 U

(51) Int. Cl.
  *G06F 3/041*    (2006.01)
(52) U.S. Cl. ........................................ 345/173; 345/156
(58) Field of Classification Search ........... 345/156–178
  See application file for complete search history.

(56) References Cited

U.S. PATENT DOCUMENTS

| | | | |
|---|---|---|---|
| 6,567,078 B2 | 5/2003 | Ogawa | |
| 7,859,483 B2 | 12/2010 | Ueno et al. | |
| 2002/0189113 A1 | 12/2002 | Chou | |
| 2003/0224807 A1 | 12/2003 | Sinha et al. | |
| 2005/0151727 A1 | 7/2005 | Kwong | |
| 2005/0231488 A1 | 10/2005 | Chou | |
| 2006/0192768 A1 | 8/2006 | Lee | |
| 2007/0195008 A1 | 8/2007 | Ueno et al. | |
| 2007/0238529 A1 | 10/2007 | Iwamoto et al. | |
| 2008/0259045 A1 | 10/2008 | Kim et al. | |

OTHER PUBLICATIONS

U.S. Appl. No. 11/819,006, filed Jun. 25, 2007, USPTO Office Action Mailed Apr. 15, 2010.
Formal Response to the Apr. 15, 2010 Office Action, Filed Jul. 9, 2010.
U.S. Appl. No. 11/819,006, filed Jun. 25, 2007, USPTO Office Action Mailed Jul. 28, 2010.
Formal Response to the Jul. 28, 2010 Office Action, Filed Nov. 29, 2010.
U.S. Appl. No. 11/819,006, filed Jun. 25, 2007, USPTO Office Action Mailed Mar. 8, 2011.
U.S. Appl. No. 12/007,396, filed Jan. 10, 2008, USPTO Office Action Mailed Dec. 1, 2010.

*Primary Examiner* — Ricardo L Osorio

(57) ABSTRACT

The present invention relates to an improved wireless multiuser touch control system which comprises comprising an input end and a host control display end, wherein the input end comprises an input end and a host control display end. The input end has a plurality of touch control handwriting devices adopted for users to write characters and draft drawings on each of first touch screens thereof, respectively; and the host control display end has a computer mainframe and a host touch control display device. One user can write characters and draft drawings on a first touch screen of the touch control handwriting device by directly using the figures thereof, so that the characters and the drawings are simultaneously shown in the host touch control display device and the other touch control handwriting devices, so as to achieve an interactive multi-user discussion, meeting and teaching.

9 Claims, 3 Drawing Sheets

WIRELESS MULTI-USER TOUCH CONTROL SYSTEM

CROSS-REFERENCE TO RELATED APPLICATIONS

This application is a continuation-in-part (CIP) of a co-pending U.S. patent application Ser. No. 11/819,006 for "Wireless multi-user touch control device", filed on Jun. 25, 2007, which claims a foreign priority from a Taiwan Patent Application Ser. No. 096208162, filed on May 18, 2007.

This application is also a CIP of a co-pending U.S. patent application Ser. No. 12/007,396 for "Wireless multiuser meeting/interactive class device with memory card connectors", filed on Jan. 10, 2008, which claims a foreign priority from a Taiwan Patent Application Ser. No. 096220291, filed on Nov. 30, 2007.

BACKGROUND OF THE INVENTION

1. Technical Field

The present invention relates to a wireless multi-user touch control device, and more particularly, to an improved wireless multi-user touch control device, therefore, the wireless multi-user touch control device is applicable to multipartite meeting, interactive class, etc. as a discussion platform, and capable of storing the discussions through memory cards.

2. Description of Related Art

In Recent years, interactive teaching, meeting and discussion are more and more popular. Referring to FIG. 1, a framework diagram of a handwriting communication system is illustrated. As shown in FIG. 1, a handwriting communication system mainly includes: an inputting side 20', a transmitting side 8A and a receiving side 10', wherein the inputting side 20' further includes: a handwriting input device 21', a writing instrument 2' and a control section 3'.

The handwriting input device 21' has a blank sheet 1' adapted for writing characters or drawing figures by using the writing instrument 2'; in addition, a retroreflective tape 6' is disposed on the writing instrument 2', and a view filed 41' as well as an image capturing device 42' are disposed on the blank sheet 1'. Thus, when a handwriting operation is conducted by using the writing instrument 2' on which the retroreflective tape 6' is wrapped, the retroreflective tape 6' returns the light emitted from an LED 5' which is provided in a TV camera 4 of the image capturing device 42' to the direction of the light source, so that the tape 6' portion looks bright than the other portions in the whole image taken by the TV camera 4', and is judged as the input position of the writing instrument 2'. Therefore, the whole image captured by the TV camera 4' further input to a computer of the transmitting side 8A through the control section 3' with a connection cable 7'. Furthermore, by way of an internet network 9' established between the computer of the transmitting side 8A and a computer of the receiving side 8B, the whole image captured by the TV camera 4' is transmitted to the receiving side computer 8B from the transmitting side computer 8A and shown in a monitor 11' of the receiving side 8B.

Thus, according to the description of the abovementioned handwriting communication system, it can easily aware of that the handwriting communication system has the drawbacks and shortcomings of:

The handwriting input device 21' merely provides users for writing or drawing by way of the writing instrument 2' with the retroreflective tape 6'. So that the user is not able to write characters or draw figures on the blank sheet 1' when the writing instrument 2' is lost.

When using the writing instrument 2' to write or draw, the blank sheet 1' can not automatically senses the direction of the writing instrument 2' but needs the TV camera 4' to capture the whole image.

In the handwriting communication system, the characters or the figures made by the user can not directly and simultaneously shown in the monitor 11', and instead of that, the handwriting communication system needs the control section 3' with the connection cable 7' and the computer 8A to storing the whole image of the characters or the figures before the image is shown in the monitor 10'.

So that, in view of the handwriting communication system has shortcomings and drawbacks, the venders further provide a wired handwriting system. Please refer to FIG. 2, which illustrates the framework diagram of the wired handwriting system, the wired handwriting system mainly includes: a wired single handwriting input board 51', a connection wire 52', a computer mainframe 53, and a display 54'.

The handwriting input board 51 is connected to a computer mainframe 53 via a connection wire 52. The user can directly touch the handwriting input board 51 to write characters or draft drawings on the handwriting input board 51. Through the processing of the computer mainframe 53, the signals are transmitted to a display 54 for showing the characters or drawings. Thus, the handwriting input board 51 can be used in various fields such as personal demonstration.

The handwriting input board 51 is connected to the computer mainframe 53 via the connection wire 52. Therefore, when used, it is necessary to lay out the wire. Such procedure is quite troublesome. Moreover, due to the limitation of the layout of the connection wire 52, it is impossible to freely change the location of the handwriting input board 51. Besides, in general, only one single handwriting input board 51 can be connected to the computer mainframe 53 for one user to use. Therefore, it is impossible to use such single handwriting input board 51 in a multiuser meeting such as a multiuser interactive class of a teacher and many students.

Accordingly, in view of the handwriting communication system and the wired handwriting system still have shortcomings and drawbacks, the inventor of the present application has made great efforts to make inventive research thereon and eventually provided an improved wireless multiuser touch control system.

BRIEF SUMMARY OF THE INVENTION

The primary objective of the present invention is to provide an improved wireless touch control system, in which an input end is able to communicate with a host control display end by way of radio frequency (RF) signal, so as to achieve an interactive multi-user discussion, meeting or teaching.

Accordingly, to achieve the abovementioned primary objective, the inventor proposes an improved wireless multiuser touch control system comprising an input end and a host control display end, wherein the input end comprises a plurality of touch control handwriting devices adopted for users to write characters and draft drawings on each of first touch screens thereof, respectively, and each of the touch control handwriting devices has a first wireless transceiver portion and a first memory card connecting portion, wherein the characters and the drawings made by the user and shown in the touch screen can be sent out in the format of radio frequency (RF) signal through the first wireless transceiver portion, moreover, the characters and the drawings can also be stored into a first memory card inserted in the first memory card connecting portion.

The host control display end is capable of communicating with the input end by way of radio frequency (RF) signal and comprises: a computer mainframe and a host touch control display device. The computer mainframe has a second wireless transceiver portion for receiving the radio frequency (RF) signal sent from the touch control handwriting devices, and capable of processing the radio frequency (RF) signal to the characters and the drawings. The host touch control display device is connected to the computer mainframe for receiving and showing the characters and the drawings.

wherein when the user writes characters and drafts drawings on one of the first touch screens of the touch control handwriting devices, the characters and the drawings are simultaneously displayed in a second touch screen of the host touch control display device, and can also be simultaneously shown in the other of the first touch screens through the transmission of the radio frequency (RF) signal; moreover, a speaker is able to write characters and draft drawings on the second touch screen of the host touch control display device, and by means of the radio frequency (RF) signal, the characters and the drawings shown in the second touch screen are also displayed in the all of the first touch screens at the same time.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an improved wireless multiuser touch control system according to the present invention, embodiments of the present invention will be described in detail with reference to the attached drawings hereinafter.

Figure 1:
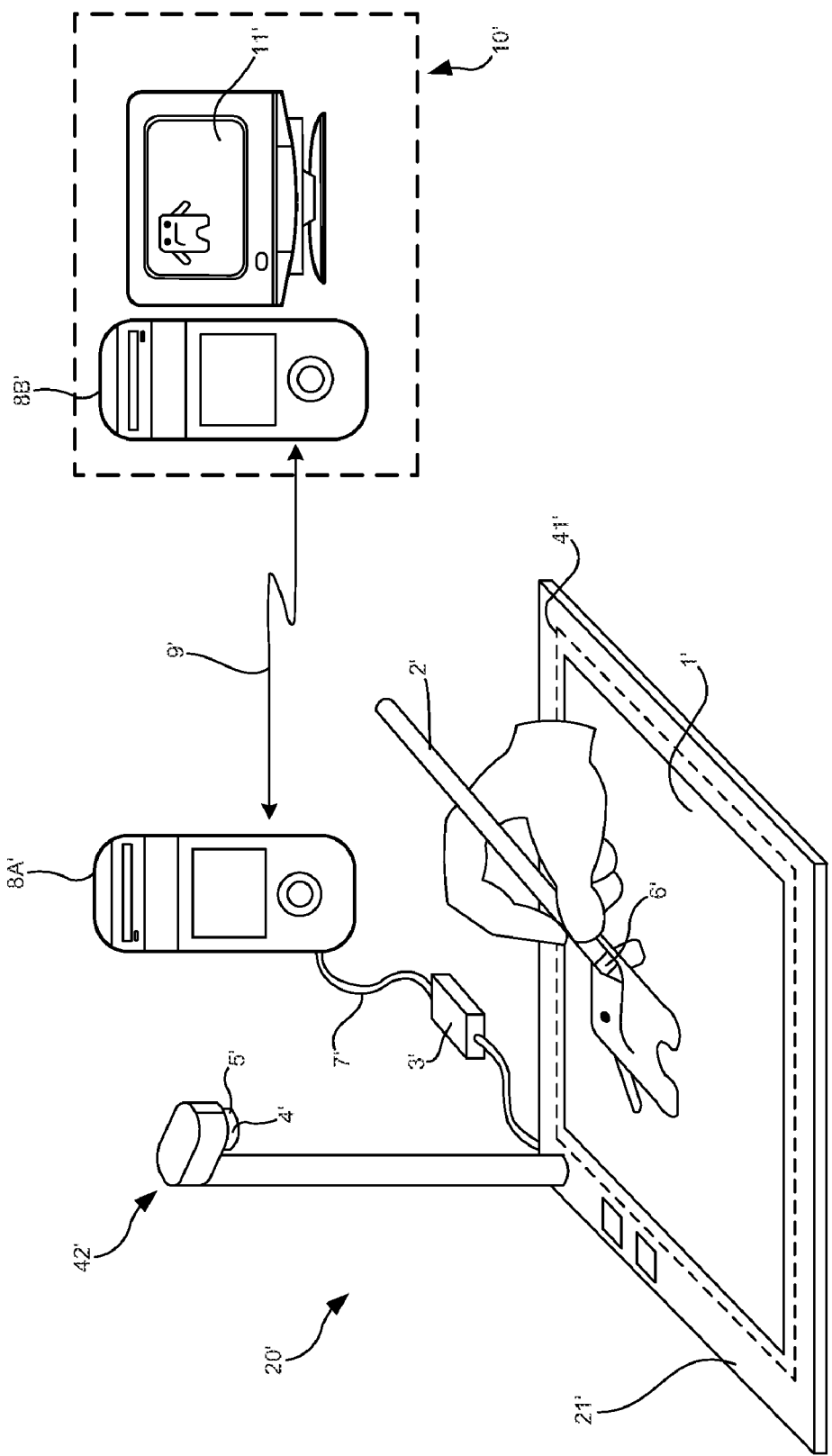
FIG. 1 is a framework diagram of a handwriting communication system.
Figure 2:
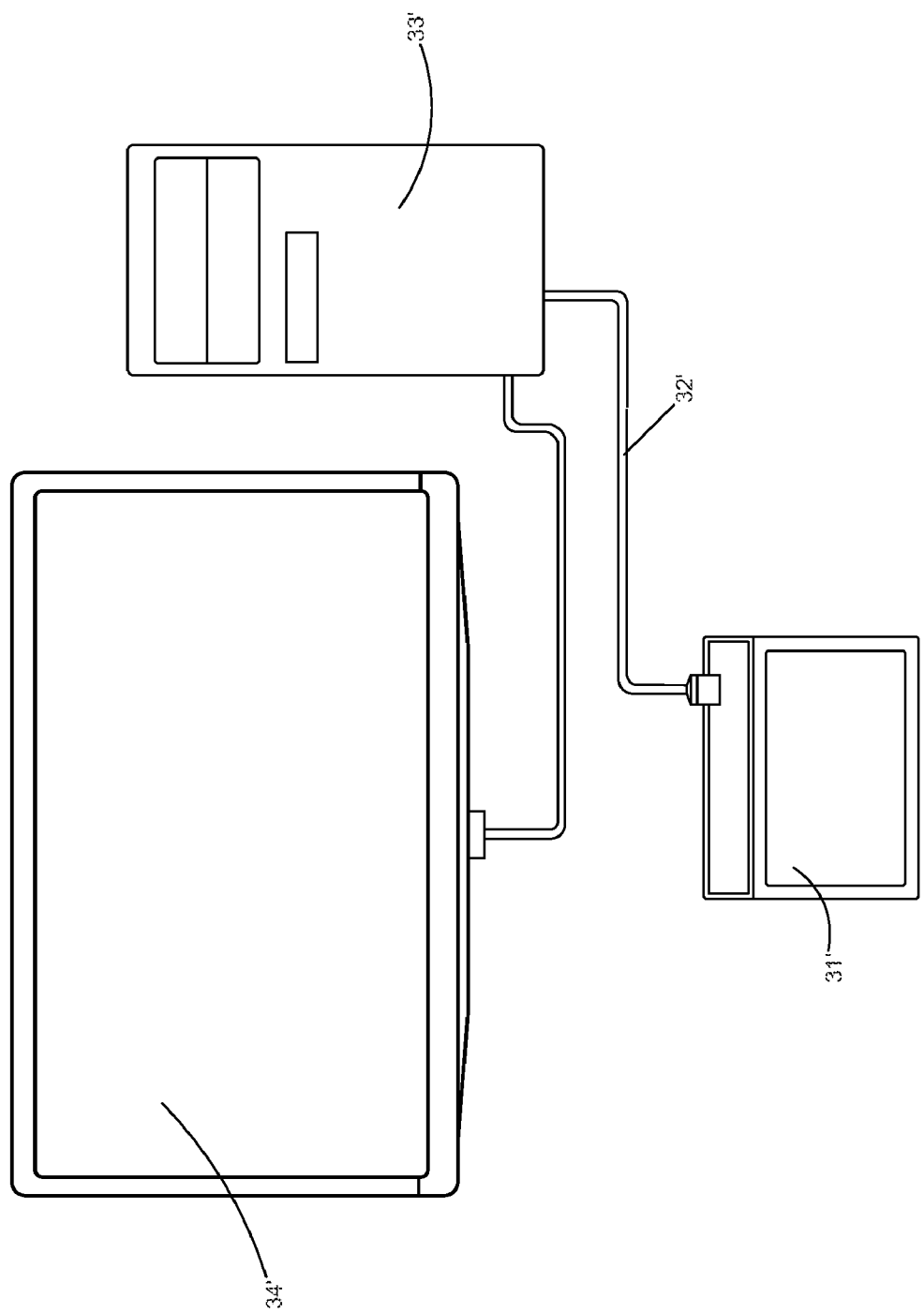
FIG. 2 is the framework diagram of a wired handwriting system.
Figure 3:
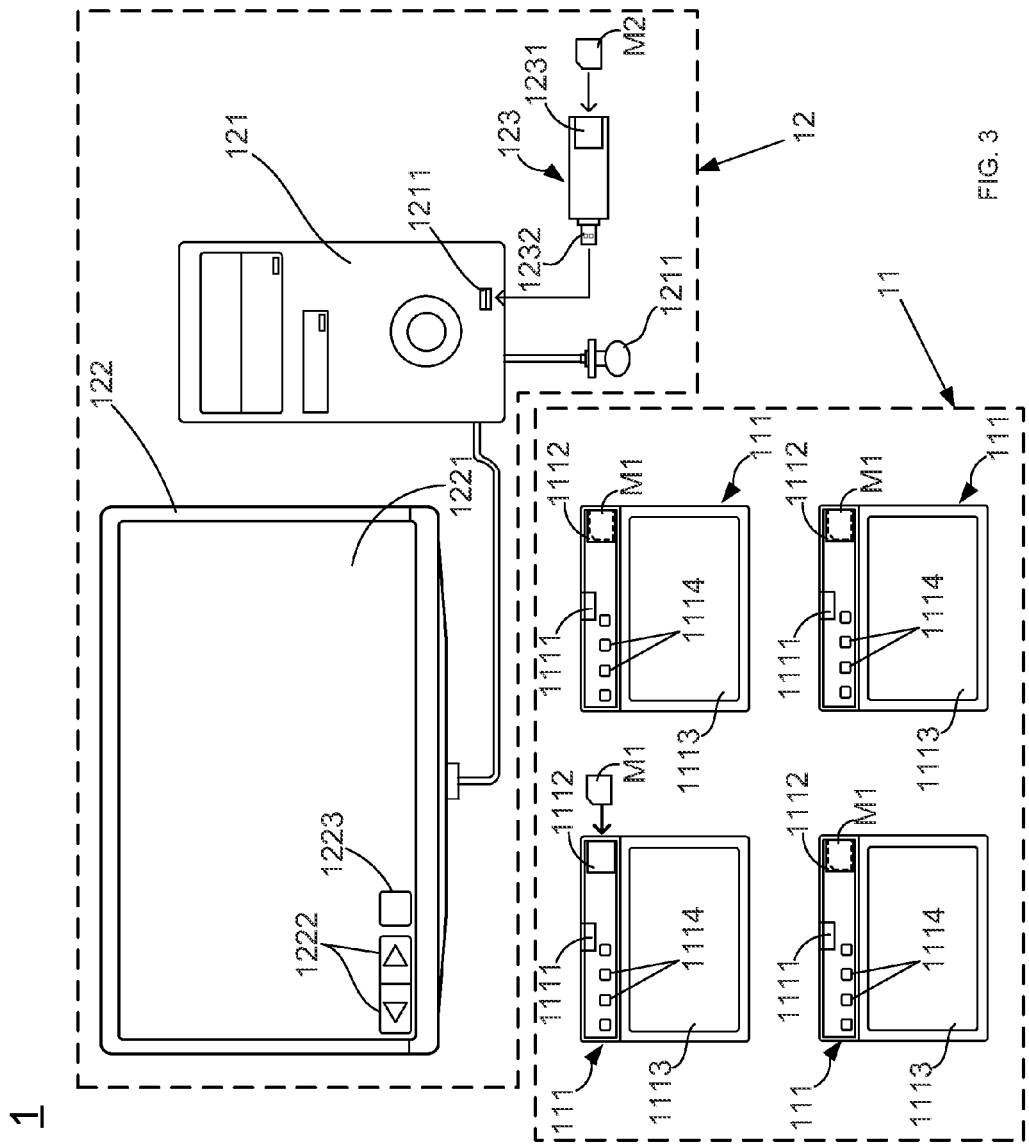
FIG. 3 is the framework diagram of an improved wireless multiuser touch control system according to the present invention.

Referring to FIG. 3, a framework diagram of an improved wireless multiuser touch control system according to the present invention is illustrated, as shown in FIG. 3, the improved wireless multiuser touch control system 1 of the present invention mainly includes: an input end 11 and a host control display end 12. The input end 11 includes a plurality of touch control handwriting devices 111, adopted for users to write characters and draft drawings on each of first touch screens 1113 thereof, respectively. Each of the touch control handwriting devices 111 has a first wireless transceiver portion 1111 and a first memory card connecting portion 1112, wherein the characters and the drawings made by the user and shown in the touch screen can be sent out in the format of radio frequency (RF) signal through the first wireless transceiver portion 1111; Moreover, the characters and the drawings can also be stored into a first memory card M1 inserted in the first memory card connecting portion 1112; in addition, the characters and the drawings stored in the first memory card M1 can be shown in others display devices with a memory card reader.

The host control display end 12 is able to communicate with the input end 11 by way of radio frequency (RF) signal.

The host control display end 12 includes a computer mainframe 121 and a host touch control display device 122, wherein the computer mainframe 121 has a second wireless transceiver portion 1211 for receiving the radio frequency (RF) signal sent from the touch control handwriting devices 111, and capable of further processing the radio frequency (RF) signal to the characters and the drawings. The host touch control display device 122 can be an LCD monitor or an LED monitor and is connected to the computer mainframe 121 for showing the characters and the drawings.

In the improved wireless multiuser touch control system 1, the characters and the drawings are simultaneously displayed in a second touch screen 1221 of the host touch control display device 122 when the user writes characters and drafts drawings on one of the first touch screens 1113 of the touch control handwriting devices 111, the characters and the drawings can also be simultaneously shown in the other of the first touch screens 1113 through the transmission of the radio frequency (RF) signal. Furthermore, when a speaker writes characters and drafts drawings on the second touch screen 1221 of the host touch control display device 122, meanwhile, by way of the radio frequency (RF) signal, the characters and the drawings shown in the second touch screen 1221 can also be displayed in the all of the first touch screens 1113 at the same time.

As shown in FIG. 3, the improved wireless multiuser touch control system further includes a portable memory card connector 123 with a second memory card connecting portion 1231 and a computer mainframe connecting portion 1232, wherein a second memory card M2 can be inserted into the second memory card connecting portion 1231, so that the characters and the drawings displayed in the host touch control display device 122 is able to be stored into the second memory card M2 after the computer mainframe connecting portion 1232 is connected to an USB connecting portion 1211 of the computer mainframe 121.

Moreover, each of the touch control handwriting devices 111 has a plurality of shortcut keys 1114 consisting of: an all-clear key, a partial-clear key, a save key, an initialization key, and a user key. For the all-clear key, it provides the functionality for the user to clear all characters and drawings; besides, the user is able to partially clear the characters and the drawings shown in the first touch screen 1113 after pressing the partial-clear key. For the save key, it provides the functionality for the user to save characters and drawings into the first memory card M1; moreover, when the user pressing the initialization key, the touch control handwriting device 111 returns an initialized setting thereof. For the user key, it provides the functionality for user to edit a personal setting of the touch control handwriting device 111.

The host touch control display device 122 further includes at least two page-changing buttons 1222 and a save button 1223 shown in the second touch screen 1221, such that the speaker is able to change the image screen pages of the second touch screen 1221 by pressing the page-changing buttons 1222; moreover, by way of by pressing the save button 1223, the speaker can save the characters and the drawings display in the second touch screen 1221 into the second memory card M2. In addition, the characters and the drawings stored in the second memory card M2 are capable of being shown in others display devices with a memory card reader.

Thus, through the above descriptions, the improved wireless multiuser touch control system according to the present invention has been disclosed completely and clearly in the above description. In summary, the present invention has the following advantages:

i. The user can not only write characters and draft drawings on the first touch screen by directly using the figures thereof, but also can write characters and draft drawings on the first touch screen by using a stylus.

ii. When one user writes characters and drafts drawings on one of the first touch screens of the touch control handwriting devices, the characters and the drawings can also be simultaneously shown in the other of the first touch screens through the transmission of the radio frequency (RF) signal, so as to achieve an interactive multi-user discussion and meeting.

iii. When the speaker writes characters and draft drawings on the second touch screen of the host touch control display device, the characters and the drawings shown in the second touch screen are also displayed in the all of the first touch screens at the same time by means of the radio frequency (RF) signal, such that an interactive multi-user teaching is carried out.

The above description is made on embodiments of the present invention. However, the embodiments are not intended to limit scope of the present invention, and all equivalent implementations or alterations within the spirit of the present invention still fall within the scope of the present invention.

I claim:

1. An improved wireless multiuser touch control system, comprising:

an input end, comprising:
a plurality of touch control handwriting devices, adopted for users to write characters and draft drawings on each of first touch screens thereof, respectively, and each of the touch control handwriting devices having a first wireless transceiver portion and a first memory card connecting portion, wherein the characters and the drawings made by the user and shown in the touch screen are sent out in the format of radio frequency (RF) signal through the first wireless transceiver portion, moreover, the characters and the drawings are stored into a first memory card inserted in the first memory card connecting portion; and a host control display end, communicating with the input end by way of radio frequency (RF) signal and comprising:
a computer mainframe, having a second wireless transceiver portion for receiving the radio frequency (RF) signal sent from the touch control handwriting devices, and capable of further processing the radio frequency (RF) signal to the characters and the drawings; and
a host touch control display device, being connected to the computer mainframe for showing the characters and the drawings;
wherein when the user writes characters and drafts drawings on one of the first touch screens of the touch control handwriting devices, the characters and the drawings being simultaneously displayed in a second touch screen of the host touch control display device, and being also simultaneously shown in the other of the first touch screens through the transmission of the radio frequency (RF) signal; moreover, a speaker being able to write characters and draft drawings on the second touch screen of the host touch control display device, and by means of the radio frequency (RF) signal, the characters and the drawings shown in the second touch screen are displayed in the all of the first touch screens at the same time.

2. The improved wireless multiuser touch control system of claim 1, further comprising a portable memory card connector having a second memory card connecting portion and a computer mainframe connecting portion, wherein a second memory card being able to be inserted into the second memory card connecting portion, so that the characters and the drawings displayed in the host touch control display device are stored into the second memory card after the computer mainframe connecting portion is connected to an USB connecting portion of the computer mainframe.

3. The improved wireless multiuser touch control system of claim 1, wherein each of the touch control handwriting devices has a plurality of shortcut keys.

4. The improved wireless multiuser touch control system of claim 3, wherein the plurality of shortcut keys are selected from the group consisting of: an all-clear key, a partial-clear key, a save key, an initialization key, and a user key.

5. The improved wireless multiuser touch control system of claim 1, wherein the host touch control display device is an LCD monitor.

6. The improved wireless multiuser touch control system of claim 1, wherein the host touch control display device is an LED monitor.

7. The improved wireless multiuser touch control system of claim 1, wherein the host touch control display device further includes at least two page-changing buttons and a save button shown in the second touch screen, such that the speaker is able to change the image screen pages of the second touch screen by pressing the page-changing buttons, moreover, by way of by pressing the save button, the speaker further saves the characters and the drawings display in the second touch screen into the second memory card.

8. The improved wireless multiuser touch control system of claim 7, wherein the characters and the drawings stored in the first memory card are shown in others display devices with a memory card reader.

9. The improved wireless multiuser touch control system of claim 7, wherein the characters and the drawings stored in the second memory card are capable of being shown in others display devices with a memory card reader.

* * * * *